US009395544B2

(12) United States Patent
Luttmann et al.

(10) Patent No.: US 9,395,544 B2
(45) Date of Patent: *Jul. 19, 2016

(54) EYEPIECE WITH SWITCHABLE REFLECTOR FOR HEAD WEARABLE DISPLAY

(71) Applicant: Google Inc., Mountain View, CA (US)

(72) Inventors: Amber M. Luttmann, Fremont, CA (US); Ozan Cakmakci, Sunnyvale, CA (US); Anurag Gupta, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/209,995

(22) Filed: Mar. 13, 2014

(65) Prior Publication Data

US 2015/0260992 A1     Sep. 17, 2015

(51) Int. Cl.
G02B 27/01 (2006.01)
G02F 1/137 (2006.01)

(52) U.S. Cl.
CPC .......... *G02B 27/0172* (2013.01); *G02B 27/017* (2013.01); *G02B 2027/014* (2013.01); *G02B 2027/0194* (2013.01); *G02F 1/13718* (2013.01)

(58) Field of Classification Search
CPC .................. G02B 27/01–2027/0198
USPC ...................... 359/629–640; 345/8
See application file for complete search history.

(56) References Cited

U.S. PATENT DOCUMENTS 4,218,111 A    8/1980    Withrington et al.
4,220,400 A    9/1980    Vizenor
4,560,233 A    12/1985   Banbury (Continued)

FOREIGN PATENT DOCUMENTS

EP    0 898 726 B1    3/2000
EP    0 995 145 B1    9/2001

(Continued)

OTHER PUBLICATIONS

Martinez, O.A. et al., "Thin Curved Eyepiece for See-Through Head Wearable Display", U.S. Appl. No. 14/537,780, filed Nov. 10, 2014, Whole Document.

(Continued)

*Primary Examiner* — Zachary Wilkes
*Assistant Examiner* — George G King
(74) *Attorney, Agent, or Firm* — Blakely Sokoloff Taylor & Zafman LLP

(57) ABSTRACT

An eyepiece for a head wearable display includes a light guide component for guiding display light received at a peripheral location offset from a viewing region and emitting the display light along an eye-ward direction in the viewing region. The light guide component includes an input surface to receive the display light into the light guide component, an eye-ward facing side, a world facing side, a total internal reflection ("TIR") portion disposed proximal to the input surface to guide the display light received through the input surface using TIR, and a partially reflective portion including a partially reflective element disposed over the eye-ward facing side and a switchable reflector disposed over the world facing side. The partially reflective portion is disposed to receive the display light from the TIR portion and to guide the display light via reflections off of the partially reflective element and the switchable reflector.

23 Claims, 9 Drawing Sheets

(56) References Cited

U.S. PATENT DOCUMENTS

| | | |
|---|---|---|
| 4,711,512 A | 12/1987 | Upatnieks |
| 4,799,765 A | 1/1989 | Ferrer |
| 4,968,117 A | 11/1990 | Chern et al. |
| 5,050,966 A | 9/1991 | Berman |
| 5,076,664 A | 12/1991 | Migozzi |
| 5,093,567 A | 3/1992 | Staveley |
| 5,237,455 A | 8/1993 | Bordo et al. |
| 5,257,133 A | 10/1993 | Chen |
| 5,537,253 A | 7/1996 | Cox et al. |
| 5,539,422 A | 7/1996 | Heacock et al. |
| 5,654,827 A | 8/1997 | Reichert |
| 5,694,230 A | 12/1997 | Welch |
| 5,696,521 A | 12/1997 | Robinson et al. |
| 5,715,337 A | 2/1998 | Spitzer et al. |
| 5,771,124 A | 6/1998 | Kintz et al. |
| 5,815,126 A | 9/1998 | Fan et al. |
| 5,821,911 A | 10/1998 | Jachimowicz |
| 5,844,530 A | 12/1998 | Tosaki |
| 5,880,888 A | 3/1999 | Schoenmakers et al. |
| 5,886,822 A | 3/1999 | Spitzer |
| 5,896,232 A | 4/1999 | Budd et al. |
| 5,923,476 A | 7/1999 | Heffner |
| 5,943,171 A | 8/1999 | Budd et al. |
| 5,949,583 A | 9/1999 | Rallison et al. |
| 5,995,071 A | 11/1999 | Mertz |
| 6,005,714 A | 12/1999 | Welch |
| 6,023,372 A * | 2/2000 | Spitzer .................. G02B 27/017 345/8 |
| 6,057,966 A | 5/2000 | Carroll et al. |
| 6,091,546 A * | 7/2000 | Spitzer .................. G02B 27/017 345/8 |
| 6,094,241 A | 7/2000 | Yamazaki |
| 6,111,701 A | 8/2000 | Brown |
| 6,147,807 A | 11/2000 | Droessler et al. |
| 6,172,657 B1 | 1/2001 | Kamakura et al. |
| 6,201,629 B1 | 3/2001 | McClelland et al. |
| 6,204,974 B1 | 3/2001 | Spitzer |
| 6,204,975 B1 | 3/2001 | Watters et al. |
| 6,222,677 B1 | 4/2001 | Budd et al. |
| 6,236,509 B1 | 5/2001 | Grandjean et al. |
| 6,236,511 B1 | 5/2001 | Brown |
| 6,330,118 B1 | 12/2001 | Daschner et al. |
| 6,349,001 B1 | 2/2002 | Spitzer |
| 6,349,004 B1 | 2/2002 | Fischer et al. |
| 6,353,492 B2 | 3/2002 | McClelland et al. |
| 6,353,503 B1 | 3/2002 | Spitzer et al. |
| 6,356,392 B1 | 3/2002 | Spitzer |
| 6,384,982 B1 | 5/2002 | Spitzer |
| 6,396,639 B1 | 5/2002 | Togino et al. |
| 6,462,882 B2 | 10/2002 | Chen et al. |
| 6,466,471 B1 | 10/2002 | Bhattacharyya |
| 6,538,799 B2 | 3/2003 | McClelland et al. |
| 6,618,099 B1 | 9/2003 | Spitzer |
| 6,690,516 B2 | 2/2004 | Aritake et al. |
| 6,701,038 B2 | 3/2004 | Rensing et al. |
| 6,724,354 B1 | 4/2004 | Spitzer et al. |
| 6,738,535 B2 | 5/2004 | Kanevsky et al. |
| 6,747,611 B1 | 6/2004 | Budd et al. |
| 6,760,169 B2 | 7/2004 | Takahashi et al. |
| 6,825,987 B2 | 11/2004 | Repetto et al. |
| 6,829,095 B2 | 12/2004 | Amitai |
| 6,847,488 B2 | 1/2005 | Travis |
| 6,879,443 B2 | 4/2005 | Spitzer et al. |
| 6,961,162 B2 | 11/2005 | Nakamura et al. |
| 7,057,814 B2 | 6/2006 | Boyd et al. |
| 7,095,562 B1 | 8/2006 | Peng et al. |
| 7,119,965 B1 | 10/2006 | Rolland et al. |
| 7,145,726 B2 | 12/2006 | Geist |
| 7,158,096 B1 | 1/2007 | Spitzer |
| 7,205,960 B2 | 4/2007 | David |
| 7,210,803 B2 | 5/2007 | Matsunaga et al. |
| 7,230,766 B2 | 6/2007 | Rogers |
| 7,242,527 B2 | 7/2007 | Spitzer et al. |
| 7,391,573 B2 | 6/2008 | Amitai |
| 7,411,637 B2 | 8/2008 | Weiss |
| 7,450,310 B2 | 11/2008 | McGuire |
| 7,457,040 B2 | 11/2008 | Amitai |
| 7,542,209 B2 | 6/2009 | McGuire, Jr. et al. |
| 7,566,863 B2 | 7/2009 | Chang et al. |
| 7,576,916 B2 | 8/2009 | Amitai |
| 7,577,326 B2 | 8/2009 | Amitai |
| 7,586,686 B1 | 9/2009 | Hall |
| 7,595,480 B2 | 9/2009 | Kress |
| 7,595,933 B2 | 9/2009 | Tang |
| 7,637,617 B2 | 12/2009 | Liu et al. |
| 7,643,214 B2 | 1/2010 | Amitai |
| 7,663,805 B2 | 2/2010 | Zaloum et al. |
| 7,672,055 B2 | 3/2010 | Amitai |
| 7,715,103 B2 | 5/2010 | Sprague et al. |
| 7,724,441 B2 | 5/2010 | Amitai |
| 7,724,442 B2 | 5/2010 | Amitai |
| 7,724,443 B2 | 5/2010 | Amitai |
| 7,821,715 B2 | 10/2010 | Suzuki et al. |
| 7,843,403 B2 | 11/2010 | Spitzer |
| 7,900,068 B2 | 3/2011 | Weststrate et al. |
| 8,004,765 B2 | 8/2011 | Amitai |
| 8,212,859 B2 | 7/2012 | Tang et al. |
| 8,294,994 B1 | 10/2012 | Kelly |
| 8,336,333 B2 | 12/2012 | Ushigome |
| 8,384,999 B1 | 2/2013 | Crosby et al. |
| 8,411,365 B2 | 4/2013 | Saito |
| 8,471,967 B2 | 6/2013 | Miao et al. |
| 8,488,246 B2 | 7/2013 | Border et al. |
| 8,665,178 B1 | 3/2014 | Wang |
| 8,760,762 B1 * | 6/2014 | Kelly et al. ............... 359/485.05 |
| 8,964,298 B2 | 2/2015 | Haddick et al. |
| 2002/0015116 A1 | 2/2002 | Park |
| 2002/0167733 A1 | 11/2002 | Roest |
| 2002/0186179 A1 | 12/2002 | Knowles |
| 2003/0090439 A1 | 5/2003 | Spitzer et al. |
| 2003/0107816 A1 | 6/2003 | Takagi et al. |
| 2004/0190150 A1 | 9/2004 | Nagaoka |
| 2005/0174651 A1 | 8/2005 | Spitzer et al. |
| 2006/0192306 A1 | 8/2006 | Giller et al. |
| 2006/0192307 A1 | 8/2006 | Giller et al. |
| 2006/0215244 A1 | 9/2006 | Yosha et al. |
| 2007/0070859 A1 | 3/2007 | Hirayama |
| 2008/0219025 A1 | 9/2008 | Spitzer et al. |
| 2008/0239422 A1 * | 10/2008 | Noda .................... G02B 27/017 359/13 |
| 2009/0067057 A1 | 3/2009 | Sprague et al. |
| 2009/0122414 A1 | 5/2009 | Amitai |
| 2010/0046070 A1 | 2/2010 | Mukawa |
| 2010/0046075 A1 | 2/2010 | Powell et al. |
| 2010/0079356 A1 | 4/2010 | Hoellwarth |
| 2010/0103078 A1 | 4/2010 | Mukawa et al. |
| 2010/0149073 A1 | 6/2010 | Chaum et al. |
| 2010/0278480 A1 | 11/2010 | Vasylyev et al. |
| 2011/0149201 A1 | 6/2011 | Powell et al. |
| 2011/0193814 A1 | 8/2011 | Gay et al. |
| 2011/0194163 A1 | 8/2011 | Shimizu et al. |
| 2011/0213664 A1 | 9/2011 | Osterhout et al. |
| 2011/0221656 A1 | 9/2011 | Haddick et al. |
| 2012/0162549 A1 * | 6/2012 | Gao .................... G02B 27/0172 349/11 |
| 2012/0212398 A1 | 8/2012 | Border et al. |
| 2012/0212399 A1 | 8/2012 | Border et al. |
| 2012/0249797 A1 | 10/2012 | Haddick et al. |
| 2012/0293548 A1 | 11/2012 | Perez et al. |
| 2013/0033756 A1 | 2/2013 | Spitzer et al. |
| 2013/0101253 A1 | 4/2013 | Popovich et al. |
| 2013/0127980 A1 * | 5/2013 | Haddick et al. ........... 348/14.08 |
| 2013/0229712 A1 | 9/2013 | Kress |
| 2014/0104692 A1 * | 4/2014 | Bickerstaff et al. ........... 359/630 |

FOREIGN PATENT DOCUMENTS

| | | |
|---|---|---|
| EP | 1 930 762 A1 | 6/2008 |
| EP | 1 465 003 B1 | 12/2008 |
| GB | 2 272 980 A | 6/1994 |
| JP | 2001-066543 A | 3/2001 |
| JP | 2008-122511 A | 5/2008 |
| JP | 2008-268846 A | 11/2008 |
| JP | 4550184 B2 | 9/2010 |

(56) References Cited

FOREIGN PATENT DOCUMENTS

| WO | WO 96/05533 A1 | 2/1996 |
|---|---|---|
| WO | WO 2007/065995 A1 | 6/2007 |
| WO | WO 2009/153446 A2 | 12/2009 |
| WO | WO 2010/097439 A1 | 9/2010 |
| WO | WO 2013/112705 A1 | 8/2013 |
| WO | WO 2013/175465 A1 | 11/2013 |

OTHER PUBLICATIONS

Martinez, M. et al., "Segmented Diffractive Optical Elements for a Head Wearable Display", U.S. Appl. No. 13/930,845, filed Jun. 28, 2013, whole document.

Cakmakci, O. et al., "Head-Worn Displays: A Review", IEEE, Journal of Display Technology, vol. 2, No. 3, Sep. 2006, pp. 199-216.

Mukawa, H. et al., "8.4: *Distinguished Paper*: A Full Color Eyewear Display using Holographic Planar Waveguides", SID Symposium Digest of Technical Papers, May 2008, vol. 39, Issue 1, pp. 89-92.

Cakmakci, O. et al. "Design of a Freeform Single-Element Head-Worn Display", Proc. of SPIE vol. 7618, 761803, 2010, 6 pages.

Kress, B. et al., "Low Cost Replicable Plastic HUD combiner element", Photonics in the Transportation Industry: Auto to Aerospace II, Proc. SPIE vol. 7314, 73140I, Apr. 2009, 8 pages.

Kress, B. et al., "Digital combiner achieves low cost and high reliability for head-up display applications", SPIE Newsroom. DOI: 10.1117/2.1200904.1599, May 2009, 3 pages.

Kress, B. et al., "Applied Digital Optics: From Micro-optics to Nanophotonics, Chapter 5: Digital Diffractive Optics: Analytic Type", 40 pages, 2009, John Wiley & Sons, Ltd.

Kress, B. et al., "Applied Digital Optics: From Micro-optics to Nanophotonics, Chapter 12: Digital Optics Fabrication Techniques", 74 pages, 2009, John Wiley & Sons, Ltd.

Kress, B. et al., "Applied Digital Optics: From Micro-optics to Nanophotonics, Chapter 14: Replication Techniques for Digital Optics", 27 pages, 2009, John Wiley & Sons, Ltd.

Kress, B. et al., "Applied Digital Optics: From Micro-optics to Nanophotonics, Chapter 16: Digital Optics Application Pools", 60 pages, 2009, John Wiley & Sons, Ltd.

Levola, T., "Diffractive Optics for Virtual Reality Displays," Academic Dissertation, Joensuu 2005, University of Joensuu, Department of Physics, Vaisala Laboratory, 26 pages.

Kent Optronics, Liquid Crystal for Photonics, "Switchable Mirror/Switchable Glass", retrieved from Internet Dec. 16, 2013, 1 page, http://www.kentoptronics.com/switchable.html.

Kent Optronics, Liquid Crystal for Photonics, "Liquid Crystal Switchable Mirror", 2 pages, http://www.kentoptronics.com, prior to Mar. 12, 2014.

Cakmakci, O. et al. "Eyepiece for Head Wearable Display Using Partial and Total Internal Reflections", U.S. Appl. No. 14/139,277, filed Dec. 23, 2013, whole document.

Cakmakci, O. et al., "See-Through Eyepiece for Head Wearable Display", U.S. Appl. No. 14/135,284, filed Dec. 19, 2013, whole document.

U.S. Appl. No. 14/537,780—Non-Final Office Action, issued Nov. 10, 2015, 10 pages.

PCT/US2015/055110—PCT International Search Report and Written Opinion, mailed Jan. 26, 2016, 13 pages.

* cited by examiner

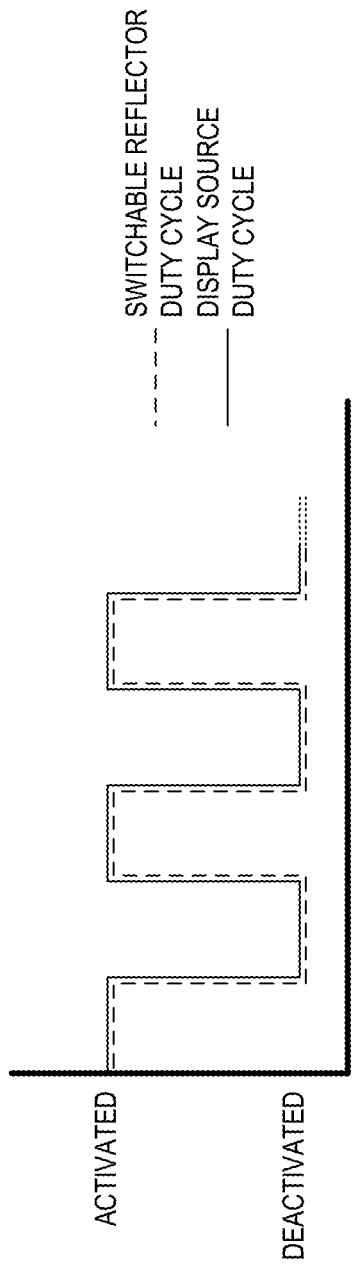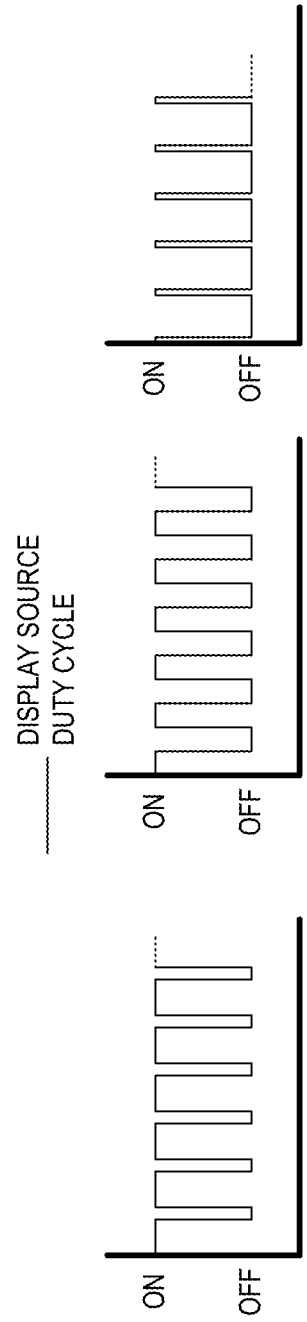

Surface C1

$$f(x,y) = \frac{cr^2}{\sqrt{1+\sqrt{1-c^2r^2}}} + a*x^2 + b*y^2 + c*x^2y + d*y^3 + e*x^4$$

$$+ f*x^2y^2 + g*y^4 + h*x^4y + i*x^2y^3$$

a=-0.00433    f=5.83E-006
b=-0.000216   g=8.3e-006
c=0.000105    h=-4.2E-007
d=-1.1E-005   i=-5.71E-007
e=1E-005

---

Surface C2

$$f(x,y) = \frac{cr^2}{\sqrt{1+\sqrt{1-c^2r^2}}} + a*x^2 + b*y^2 + c*x^2y + d*x^4$$

EYEPIECE WITH SWITCHABLE REFLECTOR FOR HEAD WEARABLE DISPLAY

TECHNICAL FIELD

This disclosure relates generally to the field of optics, and in particular but not exclusively, relates to eyepieces for head wearable displays.

BACKGROUND INFORMATION

A head mounted display ("HMD") or head wearable display is a display device worn on or about the head. HMDs usually incorporate some sort of near-to-eye optical system to create a magnified virtual image placed a few meters in front of the user. Single eye displays are referred to as monocular HMDs while dual eye displays are referred to as binocular HMDs. Some HMDs display only a computer generated image ("CGI"), while other types of HMDs are capable of superimposing CGI over a real-world view. This latter type of HMD typically includes some form of see-through eyepiece and can serve as the hardware platform for realizing augmented reality. With augmented reality the viewer's image of the world is augmented with an overlaying CGI, also referred to as a heads-up display ("HUD").

HMDs have numerous practical and leisure applications. Aerospace applications permit a pilot to see vital flight control information without taking their eye off the flight path. Public safety applications include tactical displays of maps and thermal imaging. Other application fields include video games, transportation, and telecommunications. There is certain to be new found practical and leisure applications as the technology evolves; however, many of these applications are limited due to the cost, size, weight, field of view, and efficiency of conventional optical systems used to implemented existing HMDs.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. The drawings are not necessarily to scale, emphasis instead being placed upon illustrating the principles being described.

FIG. 6 is a chart illustrating duty cycle operation of a display source and switchable reflector, in accordance with an embodiment of the disclosure.

FIGS. 7A, 7B, and 7C are charts illustrating how the duty cycles of a display source can be tuned to adjust display brightness, in accordance with an embodiment of the disclosure.

FIG. 9 is an appendix that provides sag equations describing surface curvatures of a demonstrative implementation of the eyepiece, in accordance with an embodiment of the disclosure.

DETAILED DESCRIPTION

Embodiments of a system and apparatus for an eyepiece of a head wearable display that leverages partial and total internal reflections are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
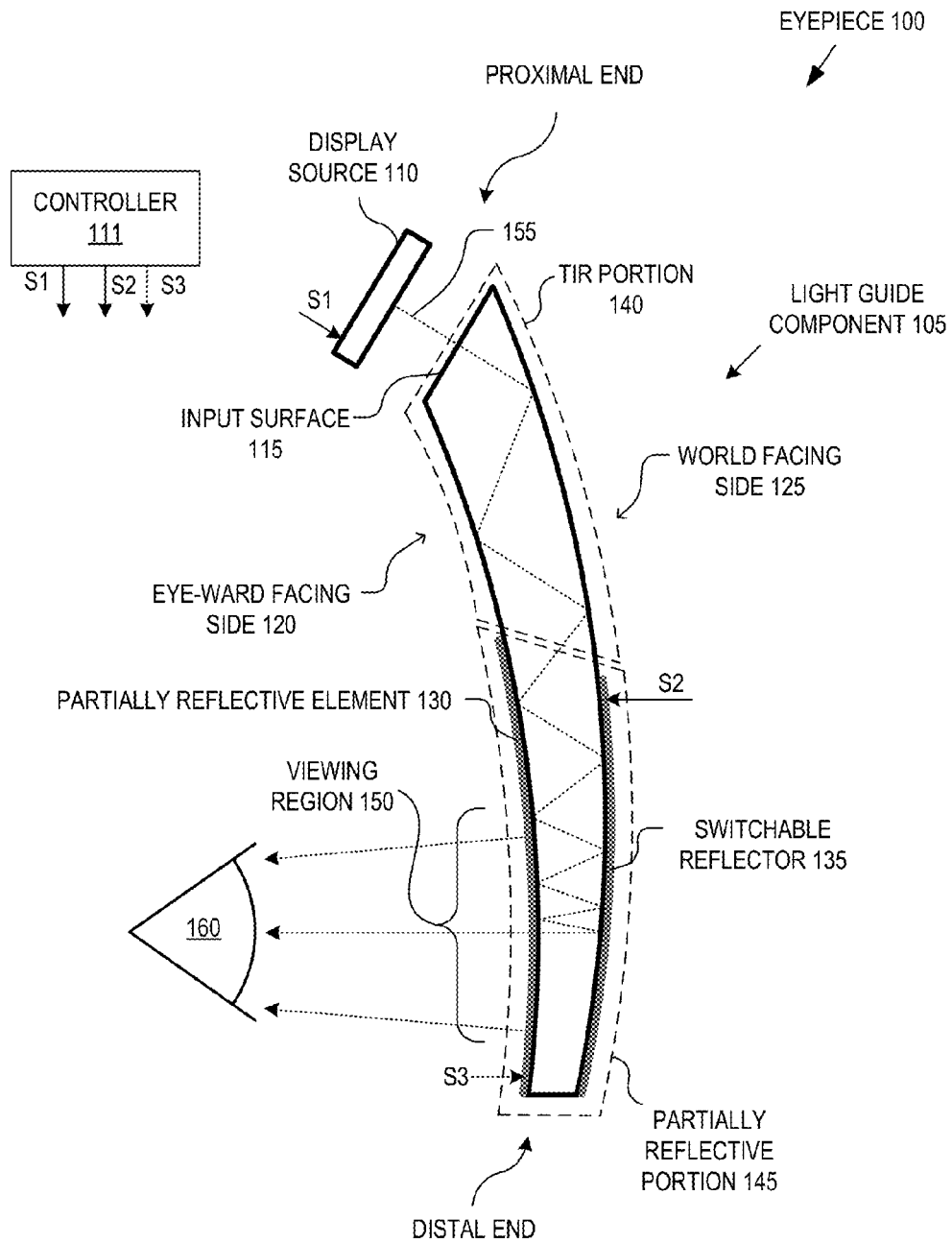
FIG. 1 is a plan view illustration of an eyepiece with a switchable reflector for a head wearable display, in accordance with an embodiment of the disclosure.

FIG. 1 is a plan view illustration of an eyepiece for a head wearable display including a switchable reflector, in accordance with an embodiment of the disclosure. The illustrated embodiment of eyepiece 100 includes a light guide component 105, a display source 110, and a controller 111. The illustrated embodiment of light guide component 105 includes an input surface 115, an eye-ward facing side 120, a world facing side 125, a partially reflective element 130, a switchable reflector 135, a total internal reflection ("TIR") portion 140, a partially reflective portion 145, and a viewing region 150.

In TIR portion 140 the light path of display light 155 is controlled such that reflections at eye-ward and world facing sides 120 and 125 are achieved via TIR. In partially reflective portion 145, the angles of incidence of the light path on eye-ward and world facing sides 120 and 125 are less than the critical angle such that TIR no longer occurs and partially reflective element 130 and switchable reflector 135 are relied upon to achieve reflection. Partially reflective portion 145 is referred to as "partially reflective" because reflections off of partially reflective element 130 are leaky, partial reflections, and further, switchable reflector 135 is operated with a duty cycle that places it in a reflective mode part of the time and in a see-through, non-reflective mode, part of the time.

Light guide component 105 is fabricated of a material having a higher index of refraction than air to induce total interface refraction ("TIR") at one or more surfaces within light guide component 105. Light guide component 105 may be fabricated of optical grade plastic (e.g., Zeonex E-330-R), glass, or otherwise. In one embodiment, the component is injection molded to shape and then processed to add various optical coatings/layers discussed below.

In the illustrated embodiment, partially reflective element 130 and switchable reflector 135 are disposed on eye-ward facing side 120 and world facing side 125, respectively, within partially reflective portion 145. In another embodiment, partially reflective element 130 and switchable reflector 135 may coat the entire sides including TIR portion 140, though the coatings are effectively unused along TIR portion 140 since internal reflections occur due to TIR. Partially reflective element 130 may be implemented as a conventional beam splitter (e.g., non-polarized beam splitter film) or a polarized beam splitter ("PBS"). The splitting ratio may be selected according to design needs, but in one embodiment may be implemented as a 50/50 beam splitter. In embodiments where partially reflective element 130 and switchable reflector 135 are implemented using a polarizing surfaces, display source 110 would output polarized light with a polarization selected to substantially reflect off of partially reflective element 130 and switchable reflector 135. A PBS design can serve to increase the efficiency of the optical system. For example, a LCD or a liquid crystal on silicon ("LCoS") display are example display technologies that output polarized light. Of course, external polarizing films may be used in connection with other non-polarized display technologies. When operating with polarized light, it can be beneficial to use low stress materials to reduce the influence of birefringence on the optical design. Accordingly, in some embodiments, light guide component 105 may be fabricated of low stress plastics, glass, or other low stress optical grade materials. In yet another embodiment, partially reflective element 130 is implemented as a holographic mirror or reflective diffraction grating tuned to partially reflect the wavelength(s) of display light 155.

Switchable reflector 135 disposed on world facing side 125 may be implemented using a switchable mirror having electrically variable transmittance/reflectance. For example, switchable reflector 135 may be an active liquid crystal device disposed along world facing side 125. The liquid crystal device may include multiple thin film layers that can rapidly switch between various transmissive, semi-transmissive/ semi-reflective, or reflective states in response to a control signal S2 applied under the influence of controller 111.

By controlling the duty cycle of activating and deactivating display source 110 using control signal S1, controller 111 can adjust the brightness of display light 155 emitted to eye 160. By controlling the duty cycle of activating and deactivating switchable reflector 135 using control signal S2, controller 111 can adjust the transparency of eyepiece 100 to external scene light in viewing region 150. These duty cycles can be synchronized, but independently varied to achieve independent control of eyepiece transparency and display brightness. Operation of the duty cycles of switchable reflector 135 and display source 110 are discussed in greater detail below in connection with FIGS. 5-8.

In yet another embodiment, partially reflective element 130 may also be implemented as a switchable reflector having a duty cycle of activation and deactivation that is influenced by control signal S3 output from controller 111 and synchronized with display source 110 and switchable reflector 135. By switching partially reflective element 130, greater transparency to external scene light can be achieved since both switchable reflector 135 and partially reflective element 130 could have their reflectivity reduced in synch. Improved efficiency for transporting display light 155 to eye 160 may also be achieved by appropriate selection of the reflectivity quotient (e.g., 33% reflectivity and 67% transmission) of partially reflective element 130 during the activation phase of its duty cycle. In general, a switchable reflector implementation for partially reflective element 130 will be operated to reflect a lower percentage of display light 155 (i.e., have greater transparency) when activated compared to switchable reflector 135 when it is activated.

Figure 3:
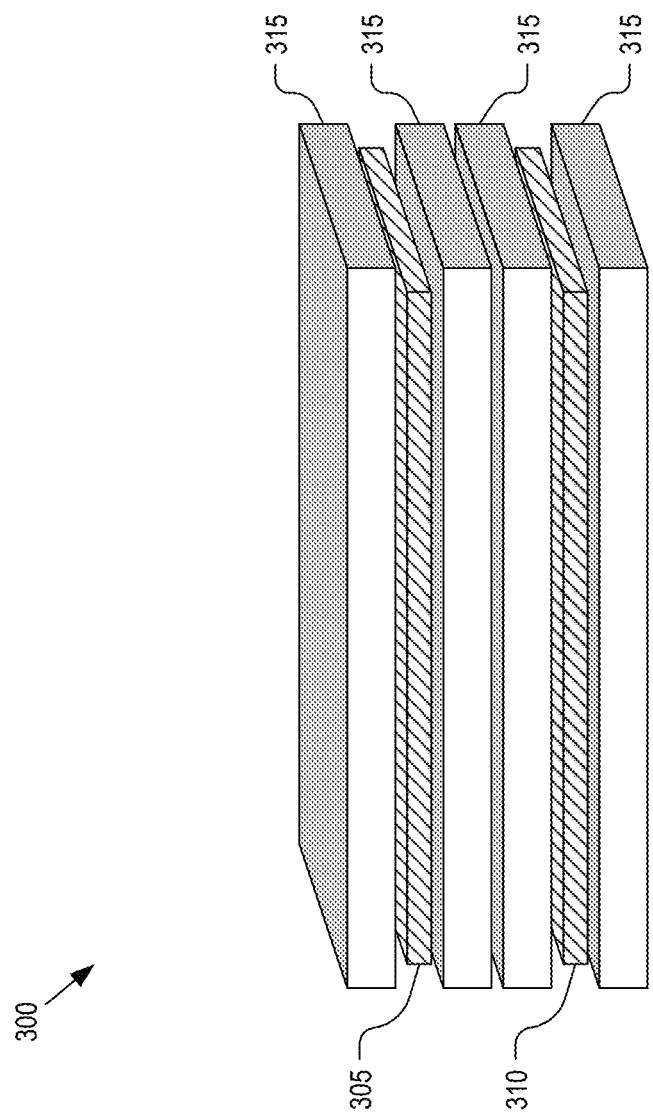
FIG. 3 is a perspective view of a multi-layer switchable reflector, in accordance with an embodiment of the disclosure.

FIG. 3 illustrates a switchable mirror 300, which is one possible implementation of switchable reflector 135. As illustrated, switchable mirror 300 is a multi-layer thin film device, which includes two layers 305 and 310 of cholesteric liquid crystal ("CLC") sandwiched between transparent substrates 315. Suitable switchable mirrors are commercially available from Kent Optronics, Inc. Switchable mirror 300 operate as follows. When no voltage is applied across the CLC layers, the liquid crystal molecules have a helical structure with a pitch that results in a Bragg reflection. When unpolarized light is incident upon a left-handed CLC layer, the left-handed circular polarization is reflected, which accounts for 50% of the light. The remaining 50% of the light that is right-handed circularly polarized is transmitted to the next CLC layer, which is a right-handed CLC layer. This transmitted right-handed circularly polarized light is then reflected by the second CLC layer. As a result, ideally 100% of the light is reflected. In practice, reflectivity quotients closer to 80% are achieved. When both CLC layers are switched by an applied electric field, the CLC molecules are unwound, causing the helical structures to disappear, thereby eliminating the Bragg reflection condition. At this point, switchable mirror 300 becomes substantially transparent. Partial application of control signals can place switchable mirror 300 into semi-reflective states where variable transmission rates are achieved (e.g., 50% transmission, 67% transmission, etc).

In one embodiment, partially reflective element 130 has a uniform reflectivity characteristic along its lengths extending from the proximal end closest to display source 110 towards the distal end furthest from display source 110. In other embodiments, the reflectivity of partially reflective layer 130 is non-uniform along a direction extending from the proximal end towards the distal end of eyepiece 100. This non-uniform reflectivity can be designed to increase brightness uniformity across viewing region 150.

During operation, display source 110 emits display light 155 from a peripheral location offset from viewing region 150 into light guide component 105. Display source 110 may be implemented using a variety of different display technologies including a liquid crystal display ("LCD"), an organic light emitting diode ("OLED") display, or otherwise. Display light 155 may include computer generated images.

Display light 155 is incident into light guide component 105 through input surface 115. In the illustrated embodiment, input surface 115 is a flat surface without optical power. In other embodiments, input surface 115 may have a curvature with optical power to apply a lensing function to display light 155.

After display light 155 enters into light guide component 105 through input surface 115, it enters into TIR portion 140. Within TIR portion 140 of light guide component 105, the angles of incidence of the optical path are such that display light 155 internally reflects off of eye-ward facing side 120 and world facing side 125 via TIR. TIR is a substantially non-lossy reflection and therefore optically efficient. In the illustrated embodiment, the initial reflection is off of world facing side 125, while a total of three TIR reflections occur within TIR portion 140. In other embodiments, two or greater TIR reflections may be implemented. Higher numbers of TIR reflections may be achieved by selecting materials with a high index of refraction. Higher index material brings the critical angle closer to normal and therefore TIR reflections can be sustained further along the length of light guide component 105 before partially reflective element 130 and switchable reflector 135 are necessary to sustain internal reflections.

Display light 155 is guided to partially reflective portion 145 via TIR reflections within TIR portion 140. Once display light 155 enters into partially reflective portion 145, partially reflective element 130 and switchable reflector 135 sustain the reflections. These reflections will typically be lossy due to the inherent nature of partially reflective coatings and switchable reflectors. However, partially reflective element 130 and switchable reflector 135 permit the incident angles to approach normal before reaching an emission area on eye-ward facing side 120 within viewing region 150. Within viewing region 150, display light 155 exits light guide component 105 along an eye-ward direction towards eye 160. In various embodiments, partially reflective portion 145 partially reflects a single ray of display light 155 four or more times between eye-ward and world facing sides 120 and 125. In the illustrated embodiment, partially reflective portion 145 partially reflects a single ray of display light 155 eight times between eye-ward and world facing sides 120 and 125.

Eye-ward facing side 120 and world facing side 125 are curved surfaces with reflective optical power as display light 155 is internally reflected and refractive optical power as display light 155 is emitted towards eye 160 in viewing region 150. The curvatures of these two surfaces operate together to adjust the vergence of display light 155 with each successive reflection and the final refraction to magnify and virtually displace the image presented to eye 160 by display light 155. The image is virtually displaced back from eye 160 by a distance (e.g., 50 cm to 10 m) that enables eye 160 to comfortably bring the near-to-eye image into focus. In other words, the curved sides of light guide component 105 operate to both transport display light 155 from a peripheral location to viewing region 150 while simultaneously collimating, or nearly collimating, the image without a separate or additional collimating lens between display source 110 and light guide component 105. This design reduces the number of optical components and reduces fabrication and assembly complexity. FIG. 9 presents example sag equations with coefficient values specifying example curvatures for eye-ward facing side 120 (surface C1) and world facing side 125 (surface C2). Of course, other curvatures may be implemented.

In one embodiment, both eye-ward facing side 120 and world facing side 125 are clear surfaces that reflect display light 155 via TIR in TIR portion 140 and via partially reflective element 130 and switchable reflector 135 in partially reflective portion 145. Clear surfaces achieve a desirable industrial design characteristic, since eyepiece 100 will appear as a clear eyepiece to external observers, particularly when switchable reflector 135 has its reflectivity disabled. Eyepiece 100 further achieves desirable industrial design characteristics with the thickness between eye-ward and world facing sides 120 and 125 ranging between 1 mm to 5 mm thick. The illustrated design can provide a 15 degree of diagonal field of view ("FOV") with an eyebox of about 10 mm and an eye relief of about 19.4 mm. Of course, other dimensions can be achieved.

Figure 2:
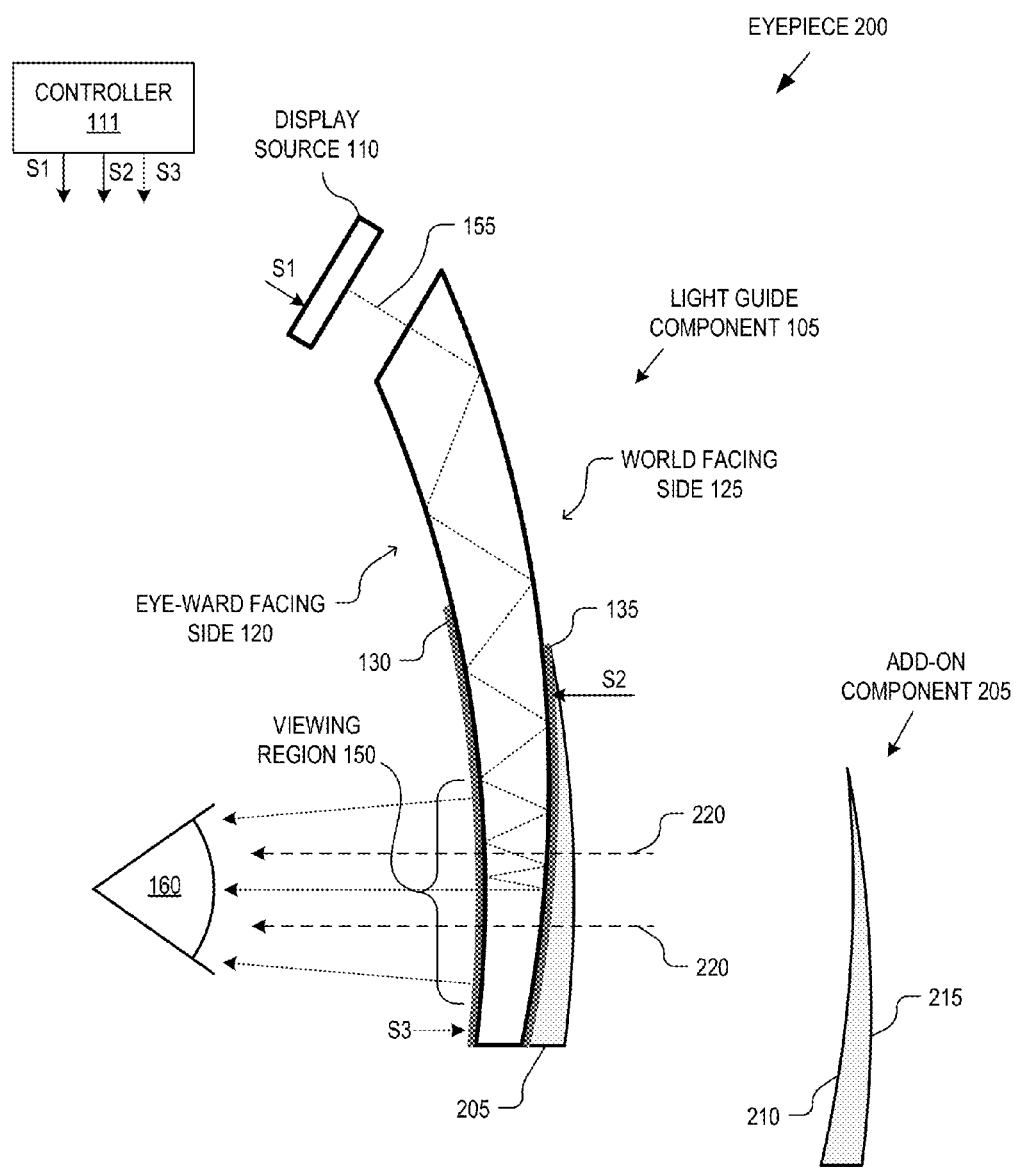
FIG. 2 is a plan view illustration of a see-through eyepiece with a switchable reflector and an add-on component for a head wearable display, in accordance with an embodiment of the disclosure.

FIG. 2 is a plan view illustration of a see-through eyepiece 200 with a switchable reflector and an add-on component for a head wearable display, in accordance with an embodiment of the disclosure. See-through eyepiece 200 is similar to eyepiece 100, except for the addition of see-through add-on component 205 in front of world facing side 125 in at least viewing region 150. The illustrated embodiment of add-on component 205 includes an interface surface 210 and external facing surface 215. In one embodiment, add-on component 205 may substantially cover the entire partially reflective portion 145 of light guide component 105.

In one embodiment, light guide component 105 and add-on component 205 are fabricated as two independent pieces that are bonded together along world facing side 125 and interface surface 210 using a clear adhesive with switchable reflector 135 sandwiched there between. Light guide component 105 and add-on component 205 may be fabricated of two different materials having the same index of refraction, or both of the same material. For example, light guide component 105 and add-on component 205 both may be fabricated of optical grade plastic (e.g., Zeonex E-330-R), glass, or otherwise. In one embodiment, the components are injection molded to shape, processed to add various optical coatings/layers (e.g., partially reflective layers 130 and 135, anti-fingerprint coatings, etc.), and then bonded together.

Since partially reflective element 130 and switchable reflector 135 are only partially reflective and light guide component 105 and add-on component 205 are fabricated of optically transmissive materials (e.g., clear plastic), viewing region 150 permits at least a portion of external scene light 220 to pass through to eye 160. Thus, see-through eyepiece 200 operates as an optical combiner, which combines external scene light 220 with display light 155 emitted through viewing portion 150 along an eye-ward direction into eye 160. In this way, eyepiece 200 is capable of displaying an augmented reality to eye 160.

As illustrated, add-on component 205 is bonded onto light guide component 105 in viewing region 150. Interface surface 210 of add-on component 205 is designed with a curvature that smoothly mates to the curvature of world facing side 125 of light guide component 105. Furthermore, add-on component 205 is designed with a curved prism or curved wedge shape that forms a smooth, continuous outer surface that includes world facing side 125 and external facing side 215. In one embodiment, the first, second, and third derivatives of the curvatures of both world facing side 125 and external facing surface 215 are controlled to achieve a smooth and continuous transition at the junction between world facing side 125 and external facing surface 215.

As mentioned above, add-on component 205 and light guide component 105 are fabricated of material(s) having the same or similar index of refraction. This serves to remove optical power at the junction between world facing side 125 and interface surface 210 for external scene light 220 that passes through viewing region 150 to eye 160. Additionally, the curvature of external scene facing surface 215 is complementary to eye-ward facing side 120 to counter-act the refractive lensing of eye-ward facing side 120. In short, the input angle of external scene light 220 entering external scene facing surface 215 is substantially equivalent to the output angle of external scene light 220 exiting eye-ward facing side 120. As such, eyepiece 200 passes at least a portion of external light 160 through viewing region 150 substantially without lensing, thereby permitting the user to have a substantially undistorted view of the ambient environment in front of eyepiece 200.

In one embodiment, the surfaces of eyepiece 100 (or 200) at which the optical path of display light 155 is redirected via TIR are coated with anti-fingerprint coatings. For example, in one embodiment, both eye-ward and world facing sides 120 and 125 in TIR portion 140 are coated with an anti-fingerprint coating to reduce the impact of fingerprint oils on total internal reflection at these surfaces. Anti-fingerprint coatings are known in the art.

Figure 4A:
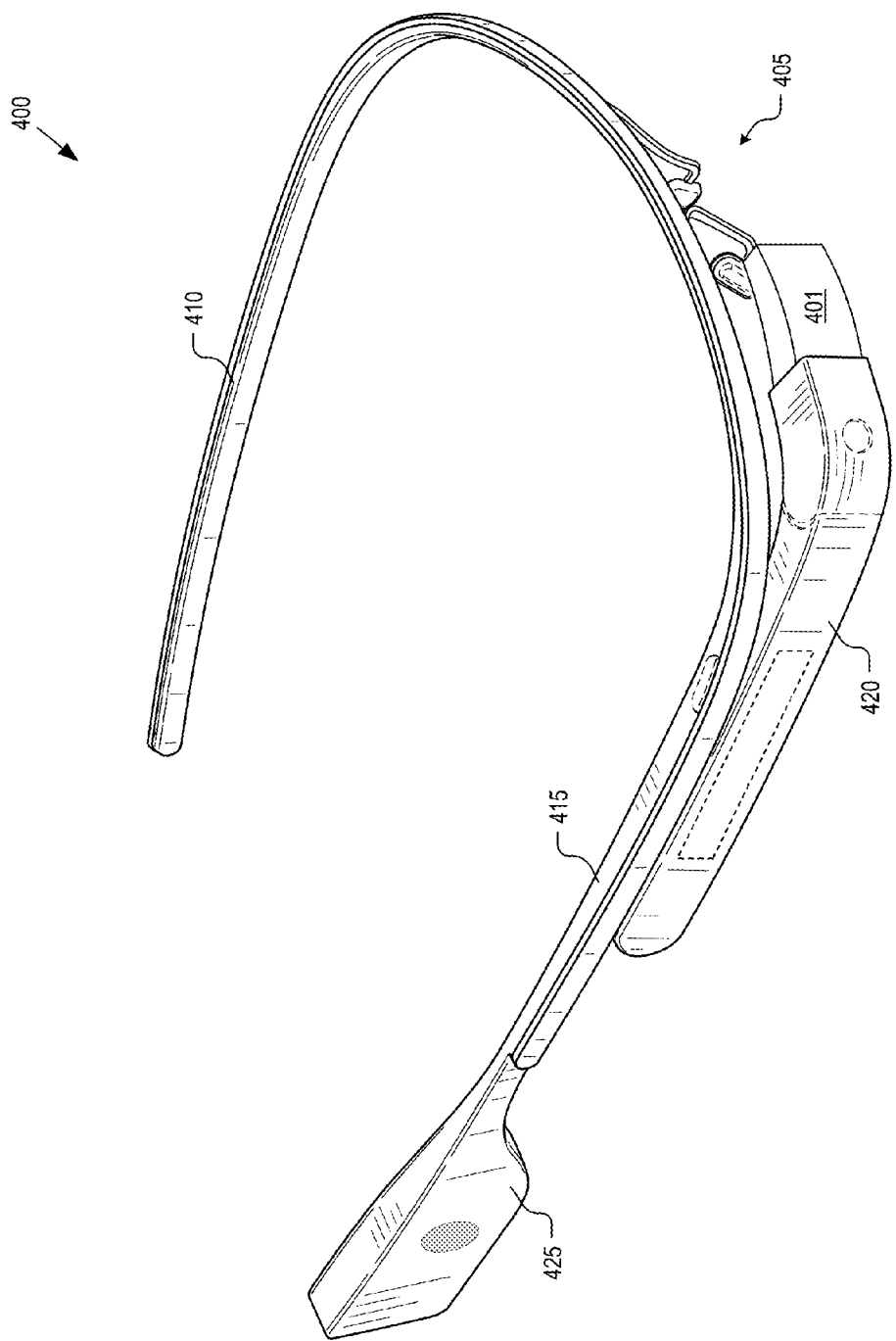
FIGS. 4A and 4B illustrate a demonstrative head wearable display including an eyepiece with a switchable reflector, in accordance with an embodiment of the disclosure.
Figure 4B:
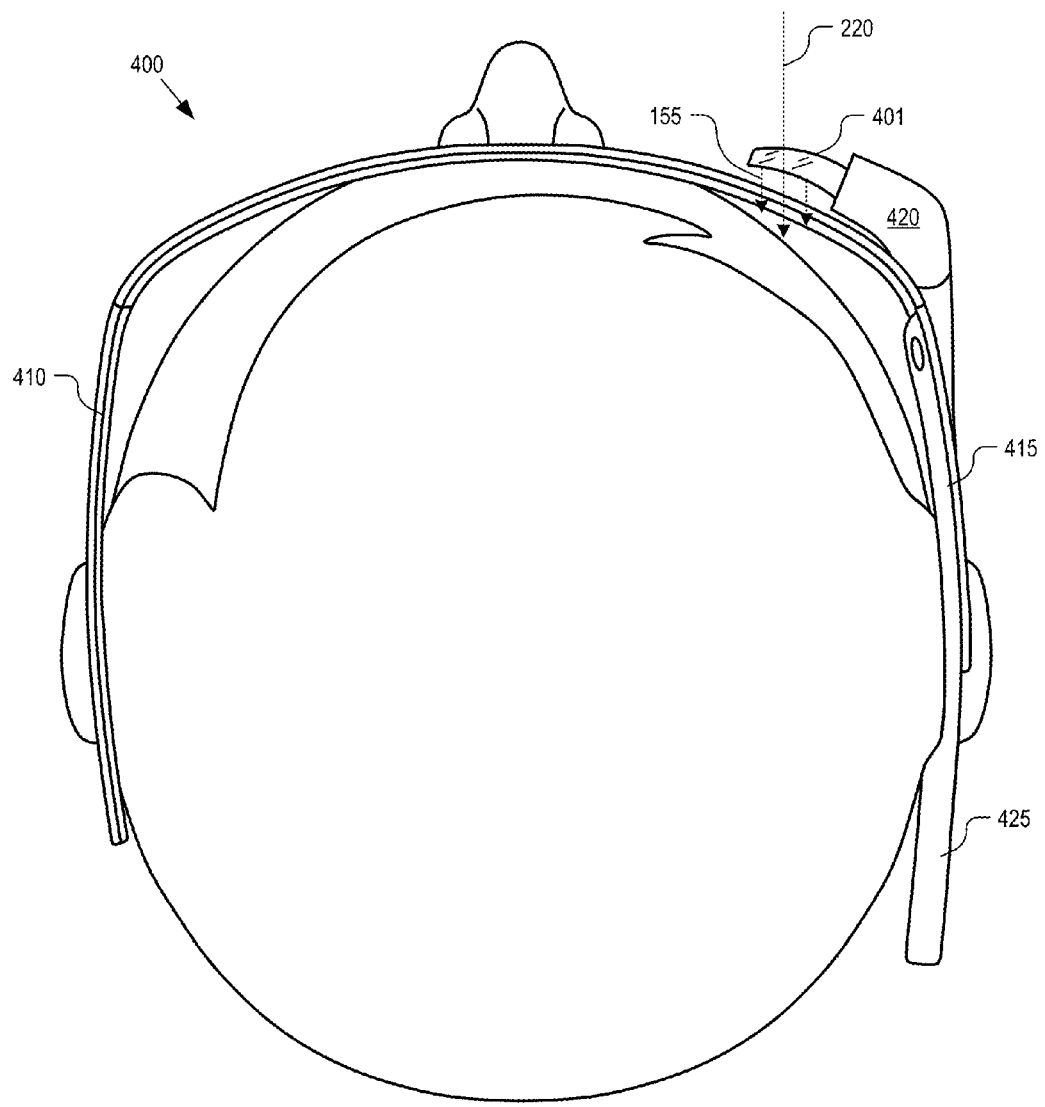

FIGS. 4A and 4B illustrate a monocular head wearable display 400 using an eyepiece 401, in accordance with an embodiment of the disclosure. FIG. 4A is a perspective view of head wearable display 400, while FIG. 4B is a top view of the same. Eyepiece 401 may be implemented with embodiments of eyepieces 100 or 200 as discussed above. Eyepiece 401 is mounted to a frame assembly, which includes a nose bridge 405, left ear arm 410, and right ear arm 415. Housings 420 and 425 may contain various electronics including a microprocessor, interfaces, one or more wireless transceivers, a battery, a camera, an ambient light sensor, a speaker, controller 111, display source 110, etc. Although FIGS. 4A and 4B illustrate a monocular embodiment, head wearable display 400 may also be implemented as a binocular display with two eyepieces 401 each aligned with a respective eye of the user when display 400 is worn.

The see-through piece 401 is secured into an eye glass arrangement or head wearable display that can be worn on the head of a user. The left and right ear arms 410 and 415 rest over the user's ears while nose bridge 405 rests over the user's nose. The frame assembly is shaped and sized to position viewing region 150 in front of an eye of the user. Other frame assemblies having other shapes may be used (e.g., traditional eyeglasses frame, a single contiguous headset member, a headband, goggles type eyewear, etc.).

The illustrated embodiment of head wearable display 400 is capable of displaying an augmented reality to the user. In see-through embodiments, eyepiece 401 permits the user to see a real world image via external scene light 220. Left and right (binocular embodiment) display light 155 may be generated by display sources 110 mounted in peripheral corners outside the user's central vision. Display light 155 is seen by the user as a virtual image superimposed over external scene light 220 as an augmented reality. In some embodiments, external scene light 220 may be fully, partially, or selectively blocked to provide sun shading characteristics and increase the contrast of image light 155 via appropriate adjustment of the duty cycle of switchable reflector 135.

Figure 5A:
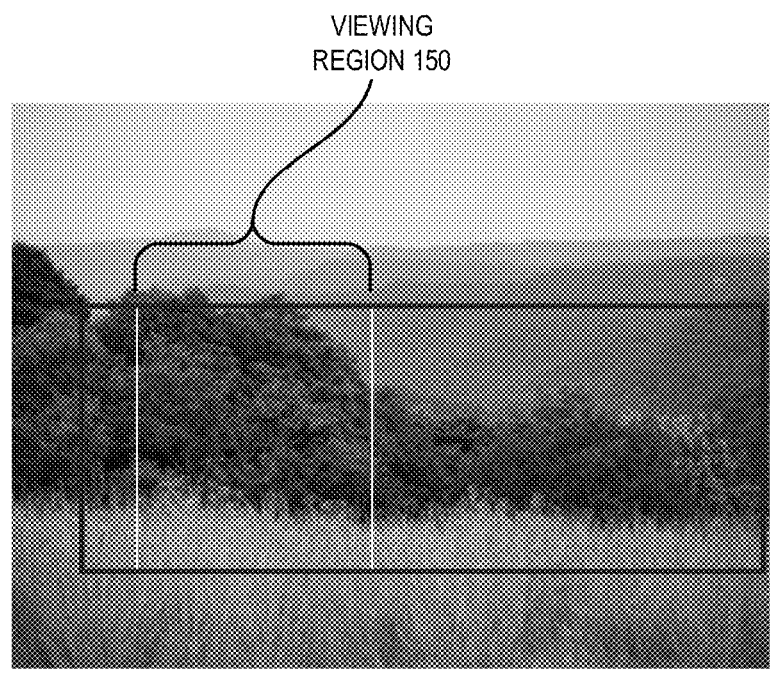
FIGS. 5A and 5B illustrate semi-transparent display characteristics of an eyepiece with a switchable reflector, in accordance with an embodiment of the disclosure.
Figure 5B:
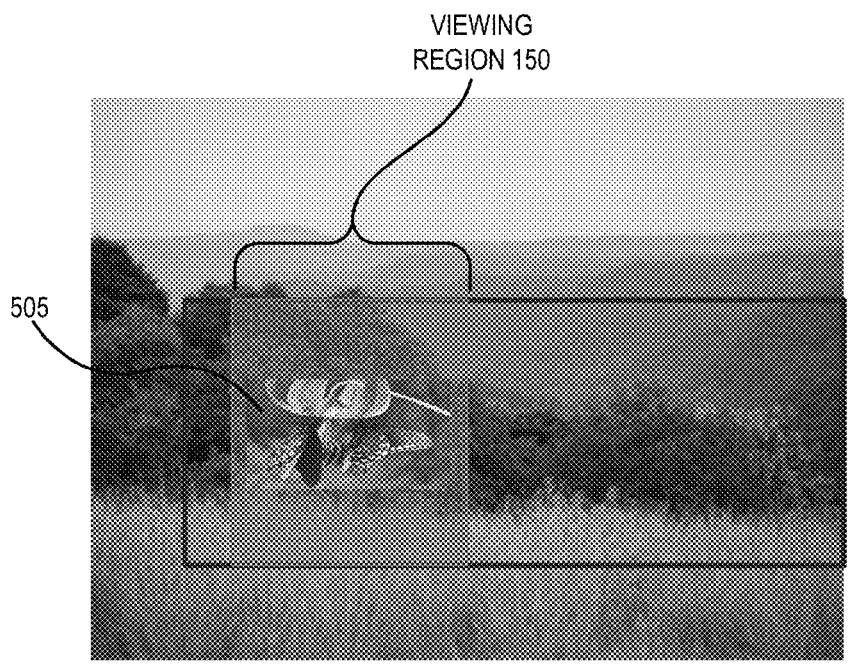

FIGS. 5A and 5B illustrate semi-transparent display characteristics of an eyepiece, such as eyepieces 100 or 200 with switchable reflector 135, in accordance with an embodiment of the disclosure. FIG. 5A illustrates when display source 110 is deactivated by controller 111, switchable reflector 135 can also be deactivated (e.g., placed into a transparent mode of operation) such that the user has a substantially unobstructed external world view in viewing region 150. FIG. 5B illustrates when display source 110 is activated to output display light 155 and generate an image 505, switchable reflector 135 is also activated (e.g., placed into a reflective mode of operation) such that display light 155 is guided within partially reflective portion 145 for emission to eye 160 in viewing region 150. By synchronizing the duty cycles of display source 110 and switchable reflector 135 and rapidly cycling between transparent and reflective modes of operations, viewing region 150 is perceived by the user to partially transparent, since switchable reflector 135 operates in the transparent mode of operation for a portion of the time. If the cycling is sufficiently quick (e.g., 30 cycles/sec), eye 160 averages the external scene light 220 received through switchable reflector 135 and perceives viewing region 150 as a semi-transparent region, as illustrated in FIG. 5B.

The eyepieces disclosed herein using switchable reflector 135 to increase the optical efficiency of the eyepiece when desired by switching to a reflective mode of operation, which has high reflectivity. However, when display source 110 is deactivated, switchable reflector 135 can be switched to a transparent mode of operation (deactivated), allowing visibility through the eyepiece. Rapidly cycling between these modes of operations while synchronizing and adjusting the duty cycles of display source 110 and switchable reflector 135 provides independent adjustability to display brightness and eyepiece transparency for dimming of bright ambient environments and increased contrast.

FIG. 6 is a chart illustrating duty cycle synchronization and operation of display source 110 and switchable reflector 135, in accordance with an embodiment of the disclosure. In the illustrated embodiment, the activation and deactivation of switchable reflector 135 and display source 110 are synchronized. While the duties cycles are synchronized, they can be independently adjusted to independently adjust the brightness of display light 155 and the transparency of viewing region 150 to external scene light 220. For example, the brightness of display light 155 can be adjusted while retaining a constant transparency by reducing or increasing the display source duty cycle while holding the switchable reflector duty cycle constant.

FIGS. 7A-7C illustrates three different possible duty cycle settings for display source 110. For example, a bright display setting may include a 90% duty cycle for display source 110 (see FIG. 7A), a medium brightness display setting may include a 50% duty cycle for display source 110 (see FIG. 7B), and a dim brightness display setting may include a 10% duty cycle for display source 110 (see FIG. 7C). For each of the display source duty cycles illustrated in FIGS. 7A-7C, the switchable reflector duty cycle may be held constant at a 90% or greater duty cycle to accommodate the 90% display source duty cycle in FIG. 7A, or may be decreased as the display source duty cycle is decreased to provide greater transparency for viewing external scene light 220. However, in each case the two duty cycles should be synchronized such that when display source 110 is activated, switchable reflector 135 is also activated to guide display light 155 to viewing region 150.

Figure 8:
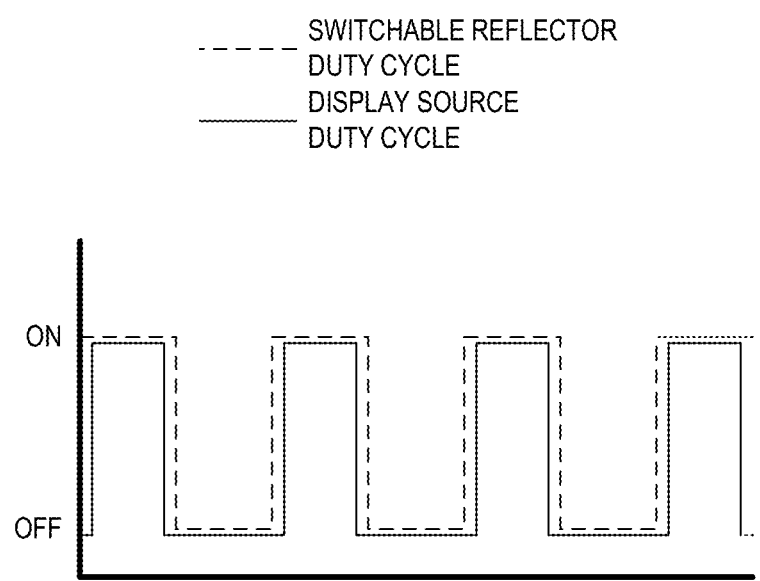
FIG. 8 is a chart illustrating how the switchable mirror and display source can be operated with different duty cycles to independently adjust eyepiece transparency and display brightness, in accordance with an embodiment of the disclosure.

FIG. 8 is a chart illustrating how the switchable reflector duty cycle should be the same as or larger than the display source duty cycle, in accordance with an embodiment of the disclosure. In other words, switchable reflector 135 can be left activated for a longer period during each cycle than display source 110. Doing so can be used to dim external scene light 220 in bright ambient environment, while maintaining a constant display brightness. Accordingly, the duty cycles of switchable reflector 135 and display source 110 need not be identical, but should still be operated in synch with each other such that switchable reflector 135 is activated at least whenever display source 110 is activated, but may also be activated for longer periods to provide increased sun blocking. In one embodiment, head wearable display 400 may include an ambient light sensor or camera coupled to provide a brightness feedback signal to controller 111. Based upon the brightness feedback signal, controller 111 can automatically adjust the duty cycle of switchable reflector 135 to provide auto-dimming of the ambient environment. For example, the switchable reflector duty cycle may be automatically increased when the brightness feedback signal exceeds a threshold level. Similarly, the switchable reflector duty cycle may be automatically decreased when the brightness feedback signal drops below the same or another threshold level.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An eyepiece for a head wearable display, the eyepiece comprising:
    a light guide component for guiding display light received at a peripheral location offset from a viewing region and emitting the display light along an eye-ward direction in the viewing region, the light guide component including:
        an input surface oriented to receive the display light into the light guide component at the peripheral location;
        an eye-ward facing side;
        a world facing side;
        a total internal reflection ("TIR") portion disposed proximal to the input surface to guide the display light received through the input surface using TIR off of the eye-ward and world facing sides; and
        a partially reflective portion including a partially reflective element disposed over the eye-ward facing side and a switchable reflector disposed over the world facing side, the partially reflective portion disposed distal to the input surface to receive the display light from the TIR portion and to guide the display light via reflections off of the partially reflective element and the switchable reflector,
    a display source to generate the display light; and
    a controller coupled to the display source and the switchable reflector to synchronize a first duty cycle that activates and deactivates the display source with a second duty cycle that activates and deactivates the switchable reflector, wherein the controller is coupled to adjust the first duty cycle of the display source to adjust a brightness of the display light and the second duty cycle of the switchable reflector to adjust a transparency of the eyepiece.

2. The eyepiece of claim 1, wherein the controller includes logic that adjusts the first duty cycle of the display source independently of the second duty cycle of the switchable reflector to independently adjust the transparency of the eyepiece from the brightness of the display light emitted along the eye-ward direction.

3. The eyepiece of claim 1, wherein the controller includes logic that increases the second duty cycle of the switchable reflector to be greater than the first duty cycle of the display source when ambient brightness exceeds a threshold level.

4. The eyepiece of claim 1, wherein the partially reflective element disposed over the eye-ward facing side comprises a second switchable reflector and wherein the controller is further coupled to the second switchable reflector to synchronize a third duty cycle of the second switchable reflector with the first and second duty cycles, wherein the second switchable reflector is switched into a partially reflective state when activated, and the wherein the partially reflective state of the second switchable reflector reflects a lower percentage of the display light than the first switchable reflector when activated.

5. The eyepiece of claim 1, wherein the eye-ward facing side of the light guide component has a first curvature and the world facing side has a second curvature different from the first curvature,
    wherein the first and second curvatures together operate to adjust the vergence of the display light via successive reflections between the eye-ward and world facing sides to virtually displace an image of the display light emitted.

6. The eyepiece of claim 1, wherein the partially reflective element comprises a partially reflective coating.

7. The eyepiece of claim 6, wherein the partially reflective coating comprise a polarized beam splitter ("PBS") coating.

8. The eyepiece of claim 1, wherein an optical path of a single ray of the display light within the light guide component includes two or more TIR reflections within the TIR portion and four or more reflections within the partially reflective portion.

9. The eyepiece of claim 1, further comprising:
    a see-through add-on component mounted to the world facing side of the light guide component in the viewing region over the switchable reflector,
    wherein the see-through add-on component and the light guide component are at least partially transparent to external scene light travelling along the eye-ward direction,
    wherein the see-through add-on component is formed of a material having an index of refraction substantially equivalent to that of the light guide component.

10. The eyepiece of claim 9, wherein the see-through add-on component comprises:
    an interface surface having a third curvature that mates to the second curvature of the world facing side in the viewing region; and
    an external facing surface having a fourth curvature that is complementary to the first curvature of the eye-ward facing side in the viewing region to substantially offset optical power of the eye-ward facing side in the viewing region for the external scene light.

11. The eyepiece of claim 1, wherein the input surface comprises a flat surface.

12. The eyepiece of claim 1, further comprising:
    a frame assembly to support the light guide component and the display source for wearing on a head of a user with the viewing region positioned in front of an eye of the user.

13. A method of displaying an image to a user of a head wearable display, the method comprising:
    receiving display light into a light guide component through an input surface disposed at a peripheral location offset from a viewing region of the head wearable display;
    guiding the display light along a total internal reflection ("TIR") portion of the light guide component disposed proximal to the input surface via TIR;
    guiding the display light received from the TIR portion along a partially reflective portion of the light guide component via partial reflections off of a partially reflective element disposed over an eye-ward facing side of the light guide component and reflections off of a switchable reflector disposed over a world facing side of the light guide component;
    synchronizing a display source that generates the display light with the switchable reflector;
    adjusting a duty cycle of the switchable reflector to adjust a transparency of the light guide component in the viewing region; and emitting the display light out the eye-ward facing side through the partially reflective element in the viewing region along an eye-ward direction.

14. The method of claim 13, wherein the duty cycle comprises a second duty cycle and wherein synchronizing the display source with the switchable reflector comprises:
synchronizing a first duty cycle that activates and deactivates the display source with the second duty cycle that activates and deactivates the switchable reflector to guide the display light along the partially reflective portion to the viewing region while permitting external scene light to pass through the switchable reflector and the partially reflective element in the viewing region when the switchable reflector is deactivated.

15. The method of claim 14, further comprising:
adjusting the first duty cycle of the display source to adjust a brightness of the display light.

16. The method of claim 15, wherein the first duty cycle of the display source is adjusted independently of the second duty cycle of the switchable reflector to independently adjust the transparency of the light guide component in the viewing region from the brightness of the display light emitted along the eye-ward direction.

17. The method of claim 14, further comprising:
increasing the second duty cycle of the switchable reflector to be greater than the first duty cycle of the display source to reduce transparency of the light guide component in the viewing region to the external scene light while not reducing the transparency of the light guide component in the viewing region to the display light.

18. The method of claim 17, wherein the increasing of the second duty cycle of the switchable reflector is triggered when an ambient brightness exceeds a threshold level.

19. The method of claim 14, wherein the partially reflective element disposed over the eye-ward facing side comprises a second switchable reflector, the method further comprising:
synchronizing a third duty cycle of the second switchable reflector with the first and second duty cycles, wherein the second switchable reflector is switched into a partially reflective state when activated, and wherein the partially reflective state of the second switchable reflector reflects a lower percentage of the display light than the first switchable reflector when activated.

20. The method of claim 13, wherein the eye-ward facing side of the light guide component has a first curvature and the world facing side has a second curvature different from the first curvature,
wherein the first and second curvatures together operate to adjust the vergence of the display light via successive reflections between the eye-ward and world facing sides to virtually displace the image projected by the display light.

21. The method of claim 20, further comprising:
passing external scene light through the light guide component and a see-through add-on component mounted to the world facing side of the light guide component in the viewing region over the switchable reflector,
wherein the see-through add-on component is formed of a material having an index of refraction substantially equivalent to that of the light guide component,
wherein an external facing surface of the add-on component has a third curvature that is complementary to the first curvature of the eye-ward facing side in the viewing region to substantially offset optical power of the eye-ward facing side in the viewing region for the external scene light.

22. The method of claim 13, wherein the partially reflective element comprises one of a non-polarizing beam splitter coating or a polarized beam splitter ("PBS") coating.

23. An eyepiece for a head wearable display, the eyepiece comprising:
a light guide component for guiding display light received at a peripheral location offset from a viewing region and emitting the display light along an eye-ward direction in the viewing region, the light guide component including:
an input surface to receive the display light into the light guide component;
an eye-ward facing side;
a world facing side;
a total internal reflection ("TIR") portion disposed proximal to the input surface to guide the display light received through the input surface using TIR off of the eye-ward and world facing sides; and
a partially reflective portion including a partially reflective element disposed over the eye-ward facing side and a switchable reflector disposed over the world facing side, the partially reflective portion disposed distal to the input surface to receive the display light from the TIR portion and to guide the display light via reflections off of the partially reflective element and the switchable reflector, and
a controller coupled to adjust a duty cycle of the switchable reflector to adjust a transparency of the eyepiece and coupled to synchronize a display source that generates the display light with the switchable reflector.

* * * * *